(12) United States Patent
Forte et al.

(10) Patent No.: US 10,442,740 B2
(45) Date of Patent: Oct. 15, 2019

(54) PLANT FERTILIZER AND SOIL ENHANCEMENT COMPOSITION DELIVERY VEHICLE AND METHOD

(71) Applicant: Mary's Premium Alpaca Poop, LLC, The Plains, VA (US)

(72) Inventors: Mary M. Forte, The Plains, VA (US); Philip J. Fetner, The Plains, VA (US)

( * ) Notice: Subject to any disclaimer, the term of this patent is extended or adjusted under 35 U.S.C. 154(b) by 138 days.

(21) Appl. No.: 15/456,488

(22) Filed: Mar. 11, 2017

(65) Prior Publication Data

US 2017/0275212 A1  Sep. 28, 2017

Related U.S. Application Data

(60) Provisional application No. 62/390,246, filed on Mar. 23, 2016.

(51) Int. Cl.
| | |
|---|---|
| *C05F 3/00* | (2006.01) |
| *C05G 3/06* | (2006.01) |
| *C05G 3/04* | (2006.01) |
| *C05B 17/00* | (2006.01) |
| *C05F 17/00* | (2006.01) |
| *C05G 3/00* | (2006.01) |
| *C05F 9/04* | (2006.01) |

(52) U.S. Cl.
CPC .......... *C05F 3/00* (2013.01); *C05B 17/00* (2013.01); *C05F 9/04* (2013.01); *C05F 17/00* (2013.01); *C05G 3/0029* (2013.01); *C05G 3/04* (2013.01); *C05G 3/06* (2013.01); *Y02A 40/205* (2018.01); *Y02A 40/216* (2018.01); *Y02P 20/145* (2015.11); *Y02W 30/43* (2015.05)

(58) Field of Classification Search
CPC ..... C05F 3/00; C05F 9/04; C05F 17/00; C05G 3/06; C05G 3/04; C05G 3/0029; C05B 17/00; Y02W 30/43; Y02P 20/145; Y02A 40/205

See application file for complete search history.

(56) References Cited

U.S. PATENT DOCUMENTS

| | | | |
|---|---|---|---|
| 6,461,399 B1 * | 10/2002 | Connell | C05D 3/02 71/11 |
| 8,246,711 B2 | 8/2012 | Marler | |
| 8,562,710 B2 | 10/2013 | Palmer et al. | |
| 8,790,436 B2 | 7/2014 | Ersek et al. | |
| 9,206,088 B2 | 12/2015 | Harman | |
| 2007/0167327 A1 | 7/2007 | Savich et al. | |

(Continued)

FOREIGN PATENT DOCUMENTS

| | | |
|---|---|---|
| CA | 2834540 A1 | 11/2013 |
| WO | WO2016044085 A1 | 9/2015 |

OTHER PUBLICATIONS

Full Disclosure of previously cited CA 2,834,540 (2013).*

(Continued)

*Primary Examiner* — Jennifer A Smith
(74) *Attorney, Agent, or Firm* — Caroline Nash

(57) ABSTRACT

A soil enhancement fertilizer composition that is delivered in a water-soluble pouch. The pouch contains specially composted and pulverized camelid manure, *Mycorrhizal fungi*, and yucca powder. The pouch is dissolved in water and stirred to release its contents and then the solution is poured on the soil and/or applied to the leaves of both indoor or outdoor container plants.

38 Claims, 4 Drawing Sheets

(56) References Cited

U.S. PATENT DOCUMENTS

2012/0090365 A1* 4/2012 Ersek .................. C05F 9/04
71/7
2013/0145805 A1 6/2013 Olson et al.
2016/0106110 A1 4/2016 Frodyma et al.

OTHER PUBLICATIONS

Aquasol Paper Pouches/Sachets/Bags/Envelopes. <https://www.aquasolpaper.com/pouches-sachets-bags-envelopes/> Oct. 4, 2014.*
O2Compost. Alpaca Manure Composting <https://www.o2compost.com/alpaca-manure-composting.aspx> Dec. 1, 2014.*
Edwards, David. "The unsung polymer: polyvinyl alcohol". Packaging Today <http://www.packagingtoday.co.uk/features/featurethe-unsung-polymer-polyvinyl-alcohol/> Mar. 14, 2012.*
Rittenhouse, Thea. Tipsheet: Compost. ATTRA Sustainable Agriculture Jul. 2015.*
Marys Alpaca Poop. Processing—The Real Poop <http://www.maryspoop.com:80/poop> Feb. 18, 2015.*
Cns News "Gov't Grants $49K to Market 'Alpaca Poop Packs" <https://www.cnsnews.com/print/news/article/eric-scheiner/govt-grants-49k-market-alpaca-poop-packs> Sep. 22, 2015.*
Moon, Vicky. "Get a load of this: Alpaca poop like 'black gold'". <https://www.fauquier.com/news/get-a-load-of-this-alpaca-poop-like-black-gold/article_dc999f1c-ed3e-11e6-8f62-93cd2546f5a7.html> Feb. 7, 2017.*
Welcome to Mary's Alpaca <http://www.marysalpaca.com/> Sep. 29, 2016.*

* cited by examiner

PLANT FERTILIZER AND SOIL ENHANCEMENT COMPOSITION DELIVERY VEHICLE AND METHOD

This application claims priority from provisional patent application U.S. Ser. No. 62/390,246 filed Mar. 23, 2016.

BACKGROUND OF THE INVENTION

Field of the Invention

The invention relates to the field of plant fertilizer and soil enhancement, particularly camelid based fertilizers and to methods of making and using fertilizer to feed plants and enhance soil.

Brief Description of Related Art

Traditional fertilizers for houseplants are typically liquid or granular fertilizers that are purchased in a quantity that is measured by the user with a measuring device and then dissolved in a measured amount of water before administering to the soil of houseplants.

The soils of potted plants often resemble the soils of crop fields where repeated planting cycles and cultivation have depleted the available nutrients. Or, equally, the overuse of fertilizers, particularly synthetic chemical fertilizers, has damaged the soil, interfered with natural food cycles, and harmed plant life. Indeed, artificial chemical fertilizers slowly poison the soil by leaving behind salts and acids that kill the bacteria, fungi, and other essential elements of the natural food web.

Healthy soils where plants thrive are alive with complex communities that work as multiple consortia, altogether providing a food web of remarkable efficiency when allowed (or encouraged) to work naturally. An acre of healthy soil can contain up to a ton of microorganisms. Every organism present has a special role and needs its own energy to succeed. Plants not only take up nutrients through their root systems but also secrete through their roots substances that attract and grow beneficial bacteria and fungi.

Nitrogen is the single most important nutrient; the basic building block of amino acids. The so-called nitrogen cycle, which is at the heart of the web of life, must specifically be enhanced for any so-called soil enhancement products to work. Chemical fertilizers that supply nitrogen in the form of nitrates cause plants to bypass the natural microbial-assisted method of offering nutrients. Ultimately, the result is deleterious effects, not enhancement.

Therefore, it is an object of the invention to provide a fertilizer composition and delivery system that enhances the overall quality of the soil so that plants can reach their maximum growth potential and health.

It is a further object of the invention to provide a better fertilizer than synthetic chemicals, which eventually destroy plant soil and ultimately harm the very plant itself.

It is a further object of the invention to provide an improved fertilizer composition for container plants—houseplants, patio containers, or small vegetable/herb gardens—or as a so-called "starter-kit" for transplanting small trees and shrubs.

It is a further object of the invention to provide organic fertilizer-levels of nitrogen/phosphorus/potassium (N—P—K), other essential vitamins and minerals, and multiple beneficial microorganisms in a delivery system that uniquely restores and improves the natural complex soil web that sustains plant life without harming the soil.

It is a further object of the invention to provide a finely fround manure compost wherein the manure particule size is small enough to stay in solution to be carried into the soil, an improvement over other composted manue products.

SUMMARY OF THE INVENTION

The present invention is directed to a water-soluble fertilizer pack to deliver camelid-derived manure nutrients combined with *mycorrhizal fungi* and yucca powder extract. The fertilizer composition and delivery system of the invention is especially designed for home use to fertilize all types of potted house plants and garden plants, including vegetables and herbs, and to enrich the soil for long-term maintenance and health. It is odor-free and totally safe for children and pets. The fertilizer composition and delivery system is organic and completely biodegradable. The fertilizer composition contains composted, pulverized camelid manure, *Mycorrhizal fungi* and yucca powder encapsulated in a water-soluble pouch for mixing with water and enriching soil for plant growth, health and maintenance.

DETAILED DESCRIPTION

Figure 1:
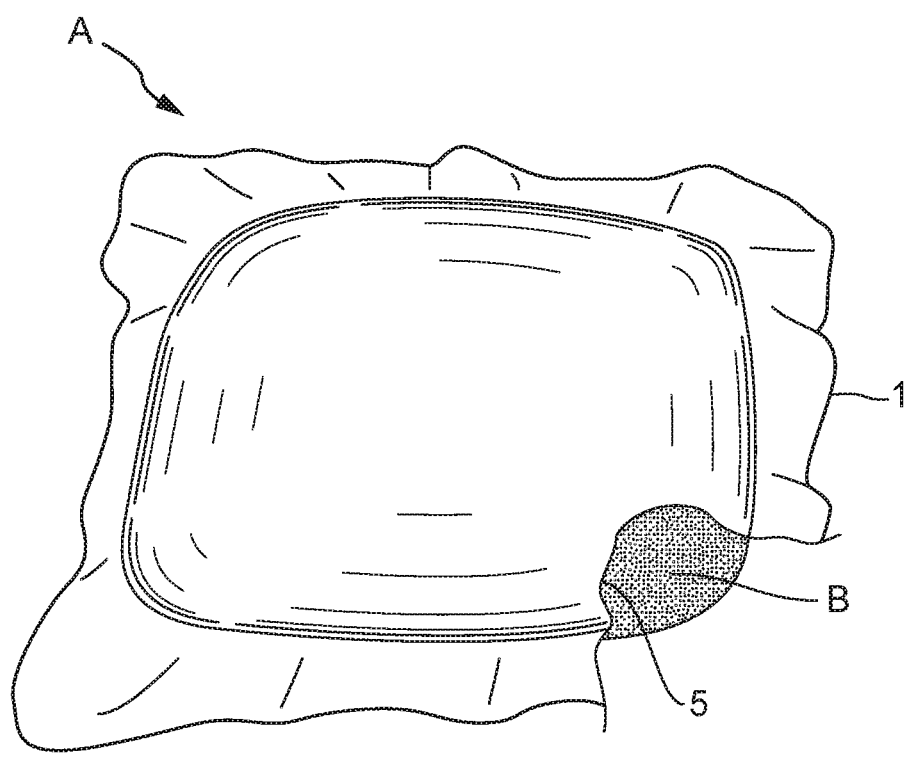
FIG. 1 is a perspective view of the fertilizer composition and delivery vehicle of the invention showing a cutout view of internal contents.

The fertilizer packs of the invention are designed to enrich soil for plant growth as well as long-term plant maintenance and health. The invention is designed for home use to fertilize houseplants, including all potted plants in and around the house and garden, outdoor garden beds, as well as flower, vegetables and herb gardens. The packs are organic, biodegradable, odor-free, and totally safe for children and pets. The packs contain a fertilizer composition that includes pulverized composted camelid manure, *Mycorrhizal fungi* and yucca powder encapsulated in a water-soluble pouch for mixing with water.

The fertilizer packs of the invention provide a fertilizer source and delivery system of essential inorganic nutrients for plants. The ingredients in the fertilizer pack improve the development and uptake of nutrients by the plant root system and enhance the "web of life" or "food web" that controls how plants live in soil. The fertilizer pack is designed to maximize and accelerate the uptake of nutrients by plants and enhance nutritional benefits.

Materials and Methods:

Manure:

The manure used in the invention is camelid manure, preferably alpaca or llama manure. Camelids are of special interest because their digestive system is significantly different from that of the typical ruminants (sheep, goats, cattle, deer) allowing them to have a higher coefficient of digestion, even higher than sheep by 25%. Camelids also have a far higher coefficient of digestion than horses. Camelid beans are small black beans that are virtually odorless because they lack undigested protein or fat particles. Camelids have a complex ruminant digestive system, with three stomach chambers, and the hay, grains, and/or pasture grass taken in remains in the animal for up to 63 hours. As a result, nearly 100% of a camelid's food is fully digested so that their manure is not "hot" and will not "burn" vegetation. It is preferred that the camelids are organically raised.

Collection of Manure:

Organic camelid manure beans are small, slightly oval black beans. They are collected from paddocks where alpacas or llamas are raised, either by hand raking or vacuum, and placed in large compost bins. Great care is taken to avoid small stones, gravel and excess field debris.

Composting of Manure:

The compost bins are located outdoors under roof and protected from rainfall. They have floor grates, under which run large pipes that push air on demand into the compost piles. To ensure that the manure does not clog the grates and prevent air circulation, a fine (up to 4") layer of raw, untreated wood shavings are laid under the manure. During the initial phase of composting, the compost bins utilize a forced-air system enabling temperature control maintaining a minimum of 131° F. to a maximum of 155° F., for 3-5 consecutive days thereby killing all harmful pathogens and weed seeds and breaking down parasitic medications. During initial composting, the manure is frequently tossed by hand and periodically wetted to maintain internal consistency and allow thermophilic heating to occur. The piles are probed daily to ensure correct temperatures, which can be controlled by airflow (oxygen supply) and moisture. The composted mixture also contains 3-5% (by volume) of wood shavings as previously described. The composting process of the invention kills *E-Coli* and *Salmonella* known to occur in all animal manure.

Secondary composting is conducted past the initial "cooking phase" because lower temperatures and forced air—in the 80-120° F. range—favor the development of aerobic bacteria. Secondary composting lasts about 2-3 months. The enzymatic breakdown and fermentation provides a favorable environment that encourages helpful microorganisms to replicate and increases the transformation efficiency of the finished compost over traditional fertilizer composts that have lost many of the helpful bacteria during the high thermophilic phase of composting, The secondary composting encourages trillions of helpful aerobic bacteria and other microorganisms to flourish in the composted manure.

Grinding:

After secondary composting, the composted manure is then run twice through a grinder to ensure a fine (roughly 10-mesh) consistent particle size of about 2.00 mm for easy handling, consistency, and to lower the dust content.

The ground compost is then pulverized at a tolling plant with a closed-loop hammer-mill with sifters. The compost is pulverized to a 50-mesh, fine powder consistency, on a submicron or nanometer scale enabling near total dissolution in water. The size of the particles at this point is approximately 0.297 mm.

The compost at this point contains about 5% moisture to keep many good microbes "awake" (not dormant) and is an appropriate moisture content for packaging. A higher moisture content would cause the formulation to clump in the pack and make ultimate dissolution in water more problematic.

The Nitrogen-Phosphorus-Potassium (N—P—K) ratio is approximately 2:3:2. Camelid manure is balanced by nature, and although the relative amounts of minerals appear less than the chemical formulations, much of the chemical formulation nutrients are lost in delivery. Applicant's delivery system maximizes nutrient preservation and uptake in the plants.

The fertilizer composition of the invention has a neutral pH value of between pH 6.0 to pH 6.2. Most animal wastes are generally alkaline.

*Mycorrhizal fungi:*

Figure 4:
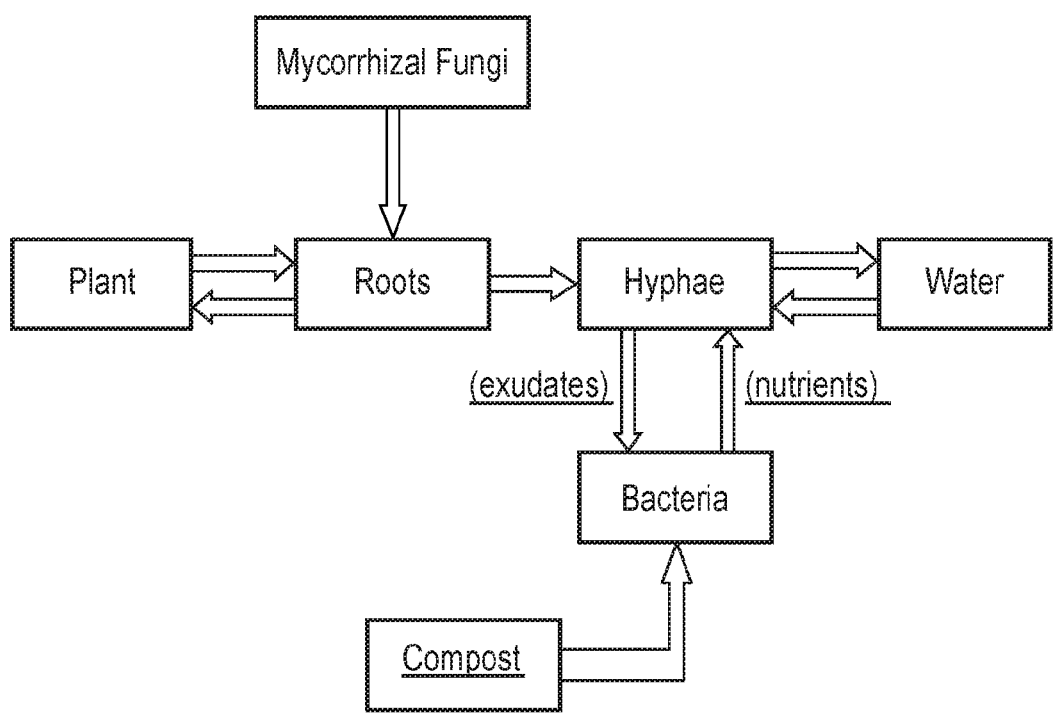
FIG. 4 is a flow chart showing the interrelationship of *Mycorrhizal fungi* with the composted manure and plants.

The *Mycorrhizal fungi* is added to improve plant root structure ("mycorrhiza" can be translated to "root fungus") to efficiently uptake nutrients from the composted manure. It also enables the plant to secure all the moisture that it requires. *Mycorrhizal fungi* are added to the composted and pulverized camelid manure for improving plant root structure and the uptake of composted manure nutrients. *Mycorrhizal fungi* form a symbiotic relationship with the plant and grow hundreds of tiny fungal filaments (hyphae) that spread out to reach far into the crevices of the soil to access, absorb and transport required nutrients back to the plant. These fungal filaments improve the root mass by hundreds or thousands of times, enhancing the complex "web of life" required for all healthy plant and soil systems. FIG. 4 shows the interrelationship of *Mycorrhizal fungi* with the composted manure and plants.

The *Mycorrhizal fungi* also play an important role in buttressing a plant's natural defense against fungal rot disease. *Mycorrhizal fungi* produce and release beneficial substances that suppress and inhibit infectious pathogens. The *Mycorrhizal fungi* also defend root systems by forming tough physical protective layers made of chitin over the outside of root cells to deter invasions of soil pathogens.

But the Mycorrhizae's greatest role is locating microscopic water sources and protecting plants from moisture deficits. The large mass of fungal hyphae developed acts as an extended root system. After a period of time, plant owners utilizing the invention could water less frequently.

The *Mycorrhizal fungal* inoculants are sold as spores, the "seeds" of fungi. The goal is to deliver the spores near the root system of target plants which is accomplished by the invention during watering with the fertilizer composition. Root activity then stimulates the spores to germinate, find a nearby root, and begin the symbiotic relationship. The selection of *Mycorrhizal fungal* in the invention is designed to be appropriate for nearly all houseplants, vegetables (and herbs) and other ordinary plant applications. A minimum quantity of spores is required to inoculate a houseplant, but the spores have a cumulative effect so that a 300-spore inoculation can be achieved in a month's time with weekly applications of 80 spores.

Roots can only take in nutrients within a plant's rhizosphere or area surrounding the roots, about ⅒ of an inch from the roots in all directions. Any fertilizer or water put into the soil is wasted that doesn't come within ⅒ of an inch of the roots. To better survive, the plant's root system secretes certain exudates (organic acids and sugars) to attract organisms (fungi and bacteria) for whatever nutrient the plant is lacking. Fungi, as hyphae, spread out and bring the nutrients to the rhizosphere (to barter them for the exudates). The hyphae expand the rhizosphere. Increasing the mycorrhizal concentration expands the effective root zones of a plant many times over, perhaps as many as 1,000 times. Eventually, the hyphae will fill most pots containing plants. The hyphae release powerful enzymes into the soil to dissolve the difficult-to-capture nutrients that are "tightly bound."

The fungi dissolve mineral nutrients, absorb water, and promote root health and, in return, receive sugars and other compounds from the plant for their own nutrition. A soil full of nitrogen and little to no *Mycorrhizal fungi* works against itself.

There are multiple types of *Mycorrhizal fungi* that can be used in the present composition. They must include both endo *mycorrhizal fungi* and ecto *mycorrhizal fungi*.

*Endomycorrhizal fungi* produce microscopic filaments called hyphae (individually, some ⅟₂₅ the diameter of human hair). They frequently grow 40 to 60 cm in length from within the root cells of the host plant and spread out into the surrounding soil. This phenomenon greatly enhances the surface area of the root system. The fungal hyphae penetrate the tiniest pores and fissures in the soil, where roots by themselves cannot reach. In fact, most of the absorbing power of the root system becomes fungal hyphae. A teaspoon of healthy soil can contain several miles of fungal hyphae. The mycorrhizae are particularly important for mobilizing key nutrients of nitrogen and phosphorus by enzymatic release from durable chemical bonds and transporting the nutrients back to the plant. Endo prefers most vegetables, annuals, perennials, shrubs, grasses, and softwood trees that generally go dormant in winter.

*Ectomycorrhizal fungi* do not grow from the roots but form filament webs around the roots and serve the same purposes. In nature, *ectomycorrhizal fungi* prefer conifers (mostly needle-leaf trees, chiefly evergreens and cone-bearing) and hardwoods, like oaks.

The preferred blend of *Mycorrhizal fungi* includes: the endo species of *Glomus intraradices, Glomus aggregatum, Glomus mosseae*, and *Glomus etunicatum* and ecto species of *Rhizopogon villosulus, Rhizopogon luteolus, Rhizopogon tinctorius, Rhizopagon amylopogon, Rhizopogon fulvigleba, Scleroderma cepa*, and *Scleroderma citrinum*. This blend is designed to cover the widest range of specific plant species and geographical locations. It is preferred that the *Mycorrhizal fungi* are certified as organic.

The fungi are in the form of ultrafine powder formulations.

Yucca Extracts:

Yucca extract powder (natural yucca shiligera) from food grade plants is added to the fertilizer composition. It makes the water "wetter" and holds the fertilizer ingredients in suspension, thereby allowing the nutrients to penetrate efficiently through the soil surface and spread to the plant's roots to improve nutrient uptake. The saponins and complex carbohydrates in yucca powder are gentle on roots and provide a friendly slow-release food for all the beneficial microorganisms in the root zone. Yucca reduces plant stress when there is less than optimal surroundings or when plants are freshly planted.

Yucca extracts from food grade plants come in a fine powder approximately equivalent in size to *Mycorrhizal fungi* (#50-mesh).

The primary purpose of adding yucca powder to the fertilizer composition is to provide a highly effective surfactant or distribution agent. Yucca contains saponins, a wetting agent that breaks the polarity of water and in effect makes the water "wetter," keeping tiny manure particles in suspension longer. Part of the composted manure particles totally dissolve in water and part stays in suspension (helped by stirring vigorously before use). Yucca ensures that the suspended particles breach the soil surface and efficiently spread to the rhizosphere. The yucca lowers the surface tension of water (by lowering the strength of the hydrogen bonding in $H_2O$). A major benefit of the invention is that the suspended aqueous composition carries the manure and its nitrogen as well as other nutrients ubiquitously to the hyphae.

The yucca powder also helps to protect against common fungal disease and provides an extra level of protection to stressed plants especially many container plants and transplants. Yucca produces antioxidants that protect cell membranes from free radicals. The most active agents here appear to be salicylic acid and Vitamin C from the yucca. How and why yucca works as a surfactant is not disputed but how it works against diseases and stress is still under debate by plant scientists.

Yucca improves foliar feeding, i.e. applying liquid fertilizer directly to the leaves of plants.

Yucca also provides slow-release nutrients (carbohydrates) for microorganisms in the root zone (some fungi and many bacteria). Feeding and sustaining the good microbial community should never be underestimated. Without the essential good microbes to break down the nutrients into a size and form absorbable by the plants, even if sufficient nutrients are available in the soil, the plant will absorb only some nutrients that physically collide with the plant's roots.

The yucca component is about 1% by weight of the total fertilizer composition; a greater percentage would lead to foaming in water when agitated or stirred.

Mixture:

The following mixture provides the approximate proportion or ratio of the various ingredients of the fertilizer composition:

1 tablespoon of composted pulverized camelid manure (8-9 grams) for nutrient and microbial boost;

½ teaspoon of a blend of *Mycorrhizal fungi* (1.3 grams) for enhancement; and

⅛ teaspoon of a natural, food-grade yucca extract (0.13 grams) as a multipurpose enabler and for surfactant qualities.

The above amounts of ingredients is suitable for dissolving in a one gallon amount of water. The amount of the above three ingredients can be doubled, tripled or multiplied for larger quantities of water.

Figure 2:
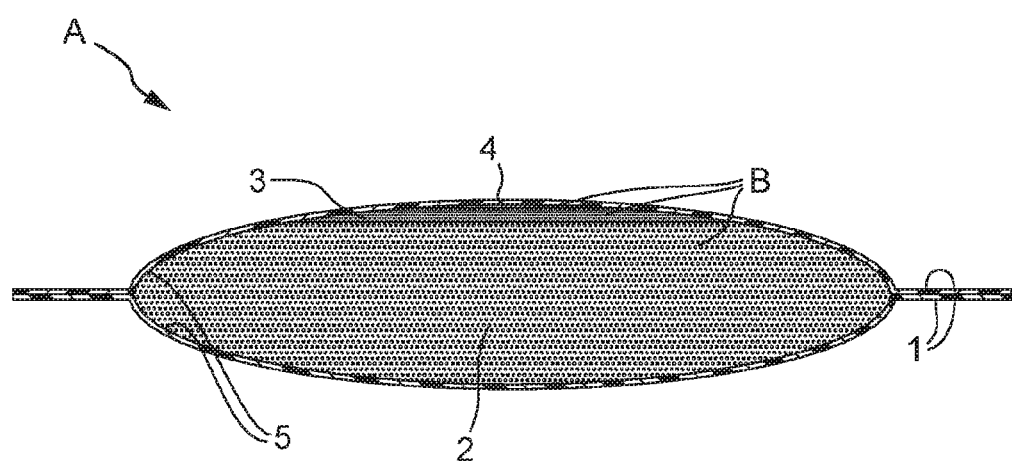
FIG. 2 is a cross-sectional view of the fertilizer composition and delivery vehicle of the invention, showing layering of the contents.
Figure 3:
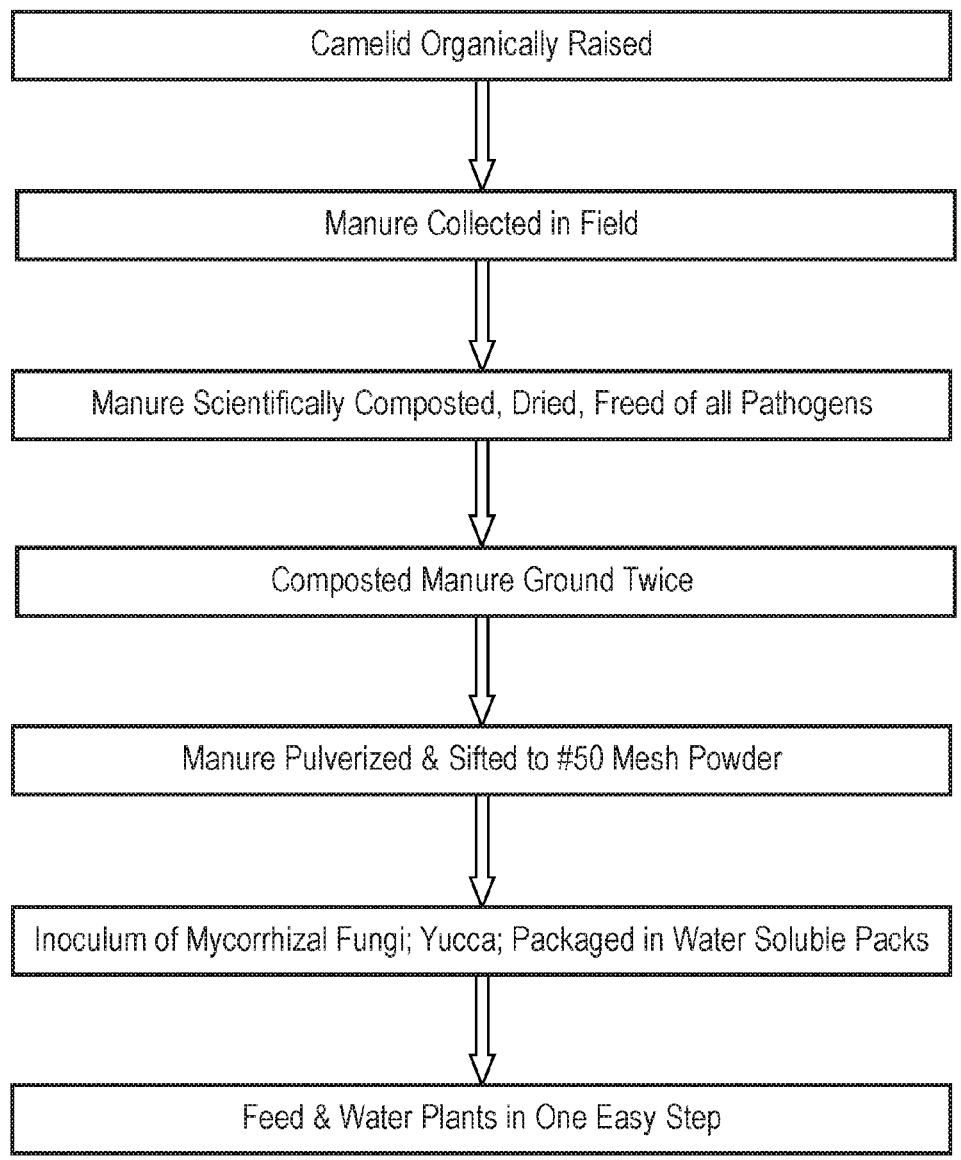
FIG. 3 is a flow chart showing the process of the invention from production of manure to feeding plants.

Packaging:

As shown if FIGS. 1 and 2, the combination of ingredients is mixed and packaged into a film pouch 1 to form single-dose fertilizer pack A. Several packs can of course be used for larger application. Each pack will typically be about 10.5 grams of components composition per pack. The film casing 1 of the packs are made of water dissolvable material. It is preferred that the material is also biodegradable. A non-limiting example of a suitable material for the film casing is polyvinyl alcohol (PVA) film or a cellulose-based material. PVA has a neutral pH and a melting point above 180° C. and is compatible with the fertilizer composition.

Inside of the pouch 5 of the pack A is the fertilizer composition B which has the ingredients: composted manure 2, *Mycorrhizal fungi* 3 and yucca powder 4. The ingredients that make up the fertilizer composition B can be layered inside the fertilizer pack, as shown in FIG. 2, or can be mixed together as shown through the cut-out window of in FIG. 1. The outer casing of the fertilizer pack may be transparent or opaque. A pack is about 1" cubed.

Application:

In use, the one or more fertilizer packs are placed in about 1 gallon of cold or warm water in a container where the packaging dissolves. The container is preferably gallon size for a single pack. The fertilizer composition is then thoroughly stirred or agitated to encourage even distribution. It is preferred that the stirring is brisk and lasts for 15-30 seconds to enable the yucca surfactant to have full effect. It should be noted that the temperature of the water appears to be irrelevant to the surfactant process; the fertilizer packs of the invention dissolve with about the same speed in warm or cold water. If the solution sits undisturbed for 20 minutes, the formulation should be stirred again for about 20 seconds before use. Hydration of the fertilizer composition activates the microbes in the composition.

Plants are watered with this solution on a weekly basis for optimum results. Leaves may also be sprayed with the solution, a process called foliar fertilization, especially helpful for drier, indoor climates.

EXAMPLES

The following is a non-limiting example of the preparation of a single pack containing the plant fertilization and soil enhancement composition of the invention and delivery vehicle and its use.

Example 1

Each pack is comprised of about 1 tablespoon (8-9 g) of ground camelid compost, about ½ teaspoon (1.13 g) of *Mycorrhizal fungi* formulation, and about ⅛ teaspoon (0.13 grams) of natural, food-grade yucca extract. The entire composition is then placed in a biodegradable/water soluble pack and sealed Example 2

In use, a single pouch is placed in cold or warm tap water, where the film dissolves. It is thoroughly stirred to encourage suspension and even solubility of the fertilizer composition. One pack treats 1 gallon of water. Plants are watered with this solution. It is preferred to water weekly initially for optimum results. Less watering and fertilization is required after prolonged use. If the solution sits undisturbed for 20 minutes, it should be stirred again before use. Foliar feedings are also recommended.

Example 3

When transplanting a plant, the fertilizer pack can be used as a 'starter-kit'. The root ball and roots are directly wetted as thoroughly as possible with the dissolved fertilizer composition. The plant is then planted in the soil and watered again with the fertilizer composition. Successive watering with the fertilizer composition is recommended to fully inoculate the root system.

The film used for the pods is 2 mils. thick.
Benefits:
The benefits of using the fertilizer composition with biodegradable film package of the invention are:
1. simplicity and ease of use;
2. feed and water at the same time;
3. accurate, premeasured dosages;
4. safe handling; no evidence of dust;
5. environmentally safe;
6. "clean hands" usage and completely safe for children and pets;
7. eliminate spill loss;
8. long shelf life; and
9. finely ground manure stays in solution so that it can be carried into soil.

Ultimately, the packaging of the composted manure, *Mycorrhizal fungi* and yucca powder achieves the goal of making organic 'gardening' fast, easy, and healthy for all home gardeners. Just add water, stir, and feed in minimal easy steps. The invention provides a soil and plant microbiological inoculum product containing essential nutrients, millions of diverse helpful microorganisms, and spores of beneficial *Mycorrhizal fungi* for the establishment, maintenance and health of the soil's web of life and the plant's root system.

What is claimed is:

1. A home use plant fertilization and soil enhancement pack comprising:
    a) a fertilizer composition comprising composted camelid manure, *Mycorrhizal fungi* and yucca powder, wherein said composted manure is pulverized to a #50 mesh particle size of about 0.297-0.3 mm; and
    b) a water-soluble pouch encapsulating said fertilizer composition.

2. The pack of claim 1, wherein said fertilizer composition comprises:
    a) about 8-9 grams composted camelid manure;
    b) about 1.3 grams *Mycorrhizal fungi*; and
    c) about 0.13 grams yucca powder.

3. The pack of claim 1, wherein the pouch is biodegradable.

4. The pack of claim 3, wherein said pouch is polyvinyl alcohol film.

5. The pack of claim 1, wherein said composted camelid manure is finely ground.

6. The pack of claim 5, wherein the composted camelid manure is pulverized to a fine powder consistency.

7. The pack of claim 1, wherein said composted camelid manure has been heated to between 131° F. and 155° F. for 3-5 consecutive days.

8. The pack of claim 7, further comprising the step of composting said camelid manure at 80-120° F. with forced air for 2-3 months.

9. The pack of claim 1, wherein the composted camelid manure contains about 5% water by weight.

10. The pack of claim 1, wherein the composted camelid manure has a Nitrogen-Phosphorus-Potassium (N—P—K) ratio of approximately 2:3:2.

11. The pack of claim 1, wherein the composted camelid manure has a pH of between pH 6.0 to pH 6.2.

12. The pack of claim 1, wherein the *Mycorrhizal fungi* comprises: endo species of *Glomus intraradices, Glomus aggregatum, Glomus mosseae*, and *Glomus etunicatum* and ecto species of *Rhizopogon villosuli, Rhizopogon luteolus, Rhizopogon tinctorius, Rhizopogon amylopogon, Rhizopogon fulvigleba Scleroderma cepa*, and *Scleroderma citrinum*.

13. The pack of claim 1, wherein the *Mycorrhizal fungi* are in the form of ultrafine powder.

14. The pack of claim 1, wherein the yucca powder is derived from food grade plants.

15. The pack of claim 1, wherein the yucca powder is about size #50-mesh.

16. The pack of claim 1, wherein the yucca powder is about 1% of the total fertilizer composition by weight.

17. The pack of claim 1, wherein the pulverized composted manure, *Mycorrhizal fungi*, and yucca powder are premeasured and layered inside of the pouch.

18. The pack of claim 1, wherein the pulverized composted manure, *Mycorrhizal fungi*, and yucca powder are premeasured, mixed and placed inside of the pouch.

19. The pack of claim 1, wherein the camelids are organically raised.

20. The pack of claim 1, wherein the camelid manure is alpaca or llama manure.

21. The pack of claim 1, wherein said water soluble pouch comprises a 2 mm thick film.

22. The pack of claim 2, comprising two or more multiples of each of a), b) and c) ingredients.

23. A home use plant fertilization and soil enhancement pack comprising:
  a) a fertilizer composition comprising about 8-9 grams composted camelid manure, wherein said composted manure is pulverized to a #50 mesh particle size of about 0.297-0.3 mm, about 1.3 grams *Mycorrhizal fungi* and 0.13 grams yucca powder, wherein said camelid manure has been heated to between 131° F. and 155° F. for 3-5 consecutive days and then kept at 80-120° F. for 2-3 months;
  b) a water-soluble, biodegradable pouch of about 1" cubed size encapsulating said fertilizer composition for small home use applications.

24. A method of making a home use container plant fertilizer and soil enhancement pack comprising the steps of:
  a) collecting camelid manure;
  b) composting said camelid manure;
  c) grinding said camelid manure to a fine particle;
  d) pulverizing said camelid manure particles to a size of about 0.297-0.3 mm;
  e) adding *Mycorrhizal fungi* and yucca powder to said manure to form a fertilizer composition; and
  f) encapsulating said fertilizer composition in a water-soluble, biodegradable pouch to form a home use fertilizer and soil enhancement pack.

25. The method of claim 24, wherein said step of composting comprises the steps of:
  a) maintaining said camelid manure at a tea temperature of about 131° F. to about 155° F. for 3-5 days to produce a first phase compost; and
  b) permitting said first phase compost to sit at 80-120° F. temperature in a forced air system for 2-3 months.

26. The method of claim 24, comprising an additional step of adding 3-5% wood shavings to said composting step.

27. The method of claim 24, wherein said camelid manure is organic.

28. The method of claim 24, wherein said *mycorrhizal fungi* comprises: endo species of *Glomus intraradices, Glomus aggregatum, Glomus mosseae,* and *Glomus etunicatum* and ecto species of *Rhizopogon villosuli, Rhizopogon luteolus, Rhizopogon tinctorius, Rhizopogon amylopogon, Rhizopogon fulvigleba Scleroderma cepa,* and *Scleroderma citrinum.*

29. The method of claim 24, wherein the *Mycorrhizal fungi* are in the form of powder.

30. The method of claim 24, wherein the yucca powder is derived from food grade plants.

31. The method of claim 24, wherein the yucca powder is the size from #50-mesh.

32. The method of claim 24, wherein said pouch is polyvinyl alcohol film.

33. The method of claim 24, wherein said fertilizer and soil enhancement pack comprises:
  about 8-9 grams composted camelid manure;
  about 1.3 grams *Mycorrhizal fungi*; and
  about 13 grams yucca powder.

34. A method of fertilizing plants and enhancing their soil comprising:
  a) dissolving a pack of claim 1 into a quantity of water;
  b) stirring the water and the pack to dissolve said pack; and
  c) pouring a quantity of the pack and water composition of step b onto soil of said plant.

35. The method of claim 34, wherein said pack is about 10.5 grams and said quantity of water is 1 gallon.

36. The method of claim 34, wherein said fertilizer and soil enhancement pack comprises:
  9 grams pulverized composted camelid manure;
  1.3 grams *Mycorrhizal fungi*; and
  0.13 grams yucca powder.

37. The method of claim 34, wherein said fertilizer is applied to leaves of said plant.

38. The method of claim 34, wherein said plant is in a container.

* * * * *